3,109,033
METHOD FOR THE PRODUCTION OF AQUEOUS TRIMETHYLOLPHENOL SOLUTIONS
George A. Senior, Jr., Bloomfield, N.J., assignor to Union Carbide Corporation, a corporation of New York
No Drawing. Filed Sept. 30, 1960, Ser. No. 59,474
9 Claims. (Cl. 260—621)

This invention relates to a method for producing aqueous trimethylolphenol solutions. More particularly, the invention relates to a method for producing aqueous trimethylolphenol solutions from the sodium salt of trimethylolphenol.

As used herein, the term "trimethylolphenol" signifies the compound 2,4,6-trimethylolphenol, which can be represented by the graphic formula

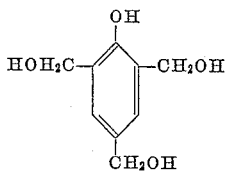

Trimethylolphenol is a water-soluble, resin-forming compound having a melting point of about 84–86° C., which is suitable for use in many applications, particularly as a component of phenolic resin compositions. The phenolic resins fromed from polyhydroxy compositions and trimethylolphenol are particularly desirable in that they can be prepared under aqueous polymerization techniques and are readily applied from aqueous solution or dispersions. Aqueous solutions containing dissolved trimethylolphenol as well as a dissolved polyhydroxy compound as glycols, polyglycols, polysaccharides, and polyhydroxy resins such as polyvinyl alcohol and the like are particularly useful as sealers for porous boards and tiles. Curing of such resinous products is conveniently accomplished by the applicaation of heat or the use of an acidic catalyst or both.

Homopolymers of trimethylolphenol can also be prepared under conditions similar to the preparation of the polyhydroxy-trimethylolphenol condensates. Because of the water solubility of the trimethylolphenol, the homopolymers can be produced under aqueous polymerization techniques. Such homopolymers are useful by virtue of their properties, particularly their application from aqueous solutions and the insolubility and infusibility of the homopolymer after curing. Concentrated aqueous solutions of trimethylolphenol have been found to be useful in mineral wool and fiber bonding applications, and particularly as binders for glass fiber batts and mats. In addition they serve very efficiently as paper beater addition products and as first coat resins for the preparation of electrical-grade paper laminates.

U.S.P. 2,889,374 to C. Y. Meyers disclosed the first commercially feasible process for producing aqueous trimethylolphenol solutions. Prior to this patent only complex and costly preparative techniques for obtaining trimethylolphenol were known to the art. Methods such as disclosed by Hunter, J. Appl. Chem. 1, 217 (1951), by Freeman, J. Am. Chem. Soc., 74, 6257 (1952) or by Martin, J. Am. Chem. Soc., 74, 3024 (1952) produced trimethylolphenol but with varying degrees of success and not in a commercially suitable manner. The product of these latter methods was a crystalline trimethylolphenol which had to be dissolved in water prior to use. This unnecessary multiplication of steps is obviated by the process disclosed in U.S.P. 2,889,374. As described therein aqueous solutions of trimethylolphenol are directly produced by neutralization of calcium or barium salts of trimethylolphenol with various acids and acid anhydrides which form water-insoluble salts with barium or calcium under the neutralization conditions. The insoluble salt is removed from the reaction vessel, leaving an aqueous trimethylolphenol solution free of contaminants. By this simple and inexpensive process directly usuable aqueous trimethylolphenol solutions are produced in high yield and with excellent purity.

The Meyers' process produces a solid, insoluble salt precipitate which is removed by a solid-liquid separation, and hence, it is not adaptable to the use of sodium trimethylolphenate because of the high degree of water solubility of practically all sodium salts.

It is an object of the present invention to provide a method for producing directly usable aqueous trimethylolphenol solutions from sodium trimethylolphenate whereby aqueous trimethylolphenol is readily isolated from sodium salts by liquid separation methods.

It has now been discovered that directly polymerizable aqueous solutions of trimethylolphenol can be prepared more rapidly and conveniently than heretofore by neutralizing sodium trimethylolphenate in aqueous solution with certain acidic materials. Surprisingly the water-soluble sodium salts are readily removed from aqueous trimethylolphenol. The acidic materials used to provide an easy means for preparation of substantially pure aqueous solutions of trimethylolphenol from sodium trimethylolphenate are phosphoric acid and sodium dihydrogen orthophosphate. The products of the neutralization reaction, an aqueous solution of trimethylolphenol and phosphate salts are surprisingly easily separable because of the formation of hydrated salts which can be removed by a liquid-liquid separation technique, e.g., decantation.

In contrast to the process of U.S.P. 2,889,374, the method of this invention produces a salt by-product which is separable from the aqueous trimethylolphenol solution although water-soluble at common temperatures.

The chief hydrated disodium phosphate salts formed in the method of the present invention are the monohydrogen orthophosphates of sodium which have the formula $$Na_2HPO_4 \cdot XH_2O$$

wherein X is 2, 7, or 12. Other sodium phosphates may be produced in very minor amounts in the present method owing to impurities in the phosphoric acid employed or for other reasons, but these have no effect on the method.

Disodium phosphate dodecahydrate ($Na_2HPO_4 \cdot 12H_2O$) is the normal hydrate of disodium phosphate at 25° C., room temperature. This hydrate salt has a limited water solubility which is quite dependent upon temperature. It melts at 34.6–35.1° C. When in the presence of water and above this temperature range it dissolves, forming disodium phosphate heptahydrate ($Na_2HPO_4 \cdot 7H_2O$). This hydrate salt of disodium phosphate is the normally stable form at temperatures from about 35° C. to about 48° C. At temperatures above 48° C., the disodium phosphate heptahydrate forms disodium phosphate dihydrate ($Na_2HPO_4 \cdot 2H_2O$). This form of the disodium phosphate salt is extremely water-soluble and is the stable hydrated form at temperatures from about 48° C. to 68° C. and above.

It is an important advantage of the present method that the most stable form of disodium phosphate under moderate conditions of temperature (less than 48° C.) is the dodecahydrate or heptahydrate, and that therefore, seven to twelve moles of water are taken up for each mole of phosphate ion used in neutralizing the sodium trimethylolphenate solution. As a result, dehydration of the aqueous trimethylolphenol solution product is automatically accomplished by the formation and removal of the by-product salt or salts. The present method is not limited to a liquid-liquid separation. The water solubility of disodium phosphate dodecahydrate, and disodium phosphate heptahydrate decreases rapidly with decreasing temperature. This facilitates isolation of the salt by simple, moderate cooling to the desired degree of crystallization, followed by filtration. Cooling to 20° C. or less, for example, and filtering provides an aqueous trimethylolphenol product containing less than 1% ash, i.e. residual sodium salts.

Because of its greater convenience, however, liquid-liquid separation of the sodium salts and the trimethylolphenol is preferred. The separation is effected, for example, by adjusting the reaction solution to a temperature above about 35° C. to liquefy the dodecahydrate salt suspended in the reaction solution at temperatures below 34.6. The salt melts and then forms a sharply defined, separate, lower liquid phase as the dodecahydrate and/or the heptahydrate dissolved in water. This lower layer is readily drawn off. Any salt by-product remaining in the aqueous trimethylolphenol is removed in subsequent steps of cooling, crystallizing and filtering. Ordinarily the amount of trimethylolphenol remaining dissolved in the lower layer is very slight and being negligible can be discarded. The simple liquid-liquid separation possible in this invention for removing by-product salts is not possible where highly insoluble barium or calcium salts are formed as by-products. In these latter processes, slower, less satisfactory filtration steps must be used to remove all the salt by-product.

The neutralization agents useful in the present invention are compounds having the formula $$Na_aH_{3-a}PO_4$$

wherein $a$ is an integer equal to 1 or 0 i.e. orthophosphoric acid, and the sodium dihydrogen orthophosphate. If desired, the phosphoric acid can be formed in situ by the addition of meta phosphoric acid, $HPO_3$ to the aqueous trimethylolphenate solution. These compounds form the hydrated monohydrogen orthophosphates of sodium. Of the above compounds, phosphoric acid is the preferred neutralizing agent because of maximum convenience and lowest cost. Any grade or concentration of phosphoric acid is suitable, but excessive dilution of the reaction solution is undesirable. Commercial phosphoric acid which contains about 85% $H_3PO_4$ and is the most readily available form of phosphoric acid, is particularly preferred. It will be noted that the use of commercial phosphoric acid as the neutralization agent introduces additional water to the sodium trimethylolphenate solution, thereby reducing the actual effective dehydration of the reaction solution accomplished by the formation of the dodecahydrate salt from 12 moles per mole of phosphoric acid added, but the amount is still considerable and automatic chemical dehydration is a chief advantage of the present invention.

The preferred amount of neutralization agent added to the aqueous sodium trimethylolphenate solution should be such as will bring the pH of the solution to a neutralized condition, that is to a pH between about 5 and 9. Any tendency of trimethylolphenol to self-condense and polymerise is at an absolute minimum at a reaction solution pH in this range. A pH range of 7.0 to 8.0 is particularly preferred. A pH of 7.0 to 8.0 is brought about, for example, by utilizing only two of the three acid hydrogens of phosphoric acid or one of the acid hydrogens of the monosodium salt of phosphoric acid. Measurement of reaction solution pH can be conveniently made by a pH meter, or by indicators or other suitable methods. Gravimetric methods can also be used to provide a solution having a pH of 7.0 to 8.0, and preferably about 7.5 which is the pH for optimum trimethylolphenol stability. Excess acidity, if encountered, can be neutralized by the addition of an acid acceptor, for example, sodium hydroxide.

The acid can be added in any convenient manner which avoids localized concentrations, in order to minimize side reactions. Slow addition of the acid with mild agitation is preferred.

Sodium 2,4,6-trimethylolphenate, the starting material in the process of this invention, can be prepared in the manner disclosed by Martin in U.S.P. 2,579,329 or in any other manner known to the art. A preferred procedure is to prepare sodium trimethylolphenate by the reaction of equimolar amounts of phenol and caustic soda with 3 to 3.5 moles of formaldehyde in an aqueous medium, followed by use of the reaction product, aqueous sodium trimethylolphenate solution, directly in the process. By following the preferred procedure, the step of isolating crystalline sodium trimethylolphenate followed by redissolution in starting the process of this invention is obviated with a saving of considerable time and expense. More importantly, sodium trimethylolphenate even in the solid state has poor stability and, in storage, tends to self-react to form higher molecular weight compounds which are carried through the process and lower the quality of the product. The amount of water initially present is not critical provided the solution remains fluid. Preferably the amount of water is adjusted according to the concentration of trimethylolphenol solids desired in the product. The starting solution obtained from the sodium trimethylolphenate preparation can be diluted with water or concentrated by evaporation or otherwise, if desired.

In a preferred embodiment, an aqueous solution of sodium trimethylolphenate obtained directly, without intermediate isolation, from the reaction in an aqueous medium of phenol, formaldehyde and sodium hydroxide is agitated at a temperature of from about 0° to 68° C. and preferably from 40° to 50° C. Neutralization at the reaction temperature or slightly below is most convenient and is particularly preferred. Phosphoric acid (85% $H_3PO_4$) is added slowly to the agitated solution and trimethylolphenol and monohydrogen ortho phosphates are formed. Use of phosphoric anhydride or monosodium ortho phosphate powders provides equivalent results in terms of product obtained but is less desirable because of the relative difficulty of handling a solid and, in the case of the monosodium salt, the need for double amounts of neutralizing agent is a drawback.

At completion of the reaction the salt by-product is removed and the aqueous trimethylolphenol solution adjusted to the desired solids content, for example, by evaporation, preferably at reduced pressures and temperatures less than 50° C.

Removal of the disodium ortho phosphates which for all practical purposes constitute the entire salt by-product is easily accomplished by maintaining the reaction solution at a temperature above the melting point of the dodecahydrate or heptahydrate salt. Maintaining the reaction solution briefly at 35–50° C. causes melting of any crystals present and causes the sodium ortho phosphate to dissolve and form a sharply defined lower layer as the reaction solution separates into two phases. Temperatures moderately above 50° C. can be used, but the possibility of side reactions is increased thereby. Generally speaking, the lowest temperature at which sharp liquid-liquid phase separation can be achieved should be used. The lower liquid phase (brine) is drawn off through a suitable outlet in the reaction vessel.

The supernatent liquid, comprising 2,4,6-trimethylolphenol, water and some dissolved sodium ortho phosphates, is then cooled to a low temperature to crystallize the greater part of the remaining salt which then precipitates and is centrifuged or filtered. The proportion of salt by-product which is crystallized from the trimethylolphenol solution is dependent upon the temperature used to crystallize and the concentration of the salt in the product solution. Crystallizing temperatures between 20° C. and 5° C. and lower are preferred because products containing less than 1% ash are obtained by such procedures. Higher crystallizing temperatures 20°–30° C., can be used where longer periods for crystallization are permissible or where ash tolerance is higher, as with trimethylolphenol solutions to be used in animal glue modification. It is of course possible, if desired, to cool the neutralization reaction solution directly without an intermediate salt liquefaction step. The quantity of salt precipitate to be separated after such a procedure though is generally prohibitive of economical processing and this is not a preferred means of salt separation.

With careful control of neutralization and salt removal the aqueous solution of trimethylolphenol is recoverable substantially free of resinous by-products and mineral salts. This solution can then be used directly for polymerization reaction. The solutions can be concentrated or diluted and may, if desired, be stored, preferably under refrigeration, without deleterious effect.

The 2,4,6-trimethylolphenol solutions herein are secured in high yields and high purity. Generally, yields of better than 90% of the theoretical are achieved of trimethylolphenols having high purities, e.g., 90%.

The following examples are illustrative. All parts and percentages are by weight, unless otherwise stated.

EXAMPLES 1 and 2

|  | Formulations | | | |
| --- | --- | --- | --- | --- |
|  | Ex. 1 | | Ex. 2 | |
|  | Weight, grams | Moles | Weight, grams | Moles |
| Phenol | 400 | 4.26 | 400 | 4.26 |
| Formalin (37%) | 1,100 | 13.6 | 720 | 8.89 |
| Paraform (91%) |  |  | 131 | 3.97 |
| Sodium hydroxide (50%) | 340 | 4.25 | 340 | 4.25 |
| Phosphoric acid (75%) | 280 | 2.14 | 280 | 2.14 |

*Example 1*

The phenol and formalin were charged to a flask to which the sodium hydroxide solution was added slowly over a period of 35 minutes. The temperature of the exothermic reaction mixture was maintained at 22–28°C. during the sodium hydroxide addition period by the use of agitation and an ice water bath. The temperature of the reaction mixture was then allowed to rise to 50° C. and was maintained at that point for six hours, during which time the free formaldehyde content of the overall reaction mixture dropped to 1.85% as determined by the hydroxylamine hydrochloride method (cf. "Formaldehyde" Walker, p. 389). The batch was then cooled to 40° C. over a period of 40 minutes and then phosphoric acid was added over a 20 minute period, to give a pH of 7.15. The agitation was then stopped and the batch held at 40° C. A sharp liquid-liquid separation occurred. The lower layer, which was predominantly molten disodium phosphate heptahydrate in water together with minor amounts of some other salts and trimethylolphenol, was drained off. It had a total weight of 848 grams. The supernatant trimethylolphenol solution was subjected to a vacuum dehydration at 40–45° C. to a refractive index of 1.5700. The cloudy solution resulting was then cooled to 5° C. and held there for about three hours. A crystalline precipitate formed which was filtered out on a Buchner funnel, leaving 808 grams of a clear, pale pink trimethylolphenol solution having the properties listed in Table I below.

*Example 2*

The phenol, formalin and paraform were charged to a flask and agitated while the sodium hydroxide solution was slowly added over a 25 minute period, the temperature being held at 28–33° C. by ice water bath cooling. The temperature was raised to 40° C. and held for six hours and 30 minutes, during which time the free formaldehyde content dropped to 3.45%. The phosphoric acid was then added, to give a pH of 7.1. The agitation was stopped and the mixture held at 40° C. A sharp liquid-liquid separation occurred in 10 minutes. The lower layer, which was essentially molten disodium phosphate heptahydrate as in Example 1, was drained off. It amounted to 731 grams. The supernatant solution was cooled to 5° C. and held for three hours; and the crystalline precipitate which formed was filtered out on a Buchner funnel, leaving 950 grams of a clear, pale pink trimethylolphenol solution having the properties listed in Table I below.

TABLE I.—PROPERTIES OF TRIMETHYLOLPHENOL PREPARATIONS

|  | Examples | |
| --- | --- | --- |
|  | 1 | 2 |
| Viscosity, at 25° C. (csts) | 65 | 38.5 |
| Nonvolatile content (percent)[1] | 62.5 | 57.3 |
| pH | 6.9 | 7.2 |
| Free formaldehyde content (percent) | 4.11 | 4.49 |
| Specific gravity, 25° C./25° C. | 1.248 | 1.225 |
| Water dilutability (percent) | 3,500+ | 3,500+ |
| Ash content (percent) | 0.71 | 0.72 |
| Alkalinity of ash (percent, calc. as $Na_2O$) | 0.38 | 0.31 |
| Color, Gardner | 4 | 4 |

[1] Nonvolatile content is the weight, expressed as a percentage of the original solution weight, of the residue remaining after a mixture consisting of approximately 2 grams of said solution and 10 ml. methanol is heated, in an uncovered, 2″ diameter ointment tin for 2 hours at 149° C. in a circulating air oven.

TABLE II.—SUMMARY OF PROCESS DATA

|  | Examples | |
| --- | --- | --- |
|  | 1 | 2 |
| Yield—actual, grams | 808 | 950 |
| Yield—calculated to 60% nonvolatiles | 842 | 908 |
| Brine separated, grams | 848 | 731 |
| Filter cake, grams | 142 | 137 |
| Cycle time, hours | 13 | 11 |

What is claimed is:

1. Method for the preparation of directly polymerizable aqueous solutions of 2,4,6-trimethylolphenol substantially free of resinous by-products and mineral salts which includes the steps of adding to an aqueous solution of sodium 2,4,6-trimethylolphenate maintained at a temperature between about 0° and 68° C. an amount of an acidic material having the formula $$Na_aH_{3-a}PO_4$$

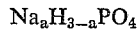

wherein $a$ is a whole number from 0 to 1 inclusive, sufficient to provide a pH in said solution of between about 5 and 9, thereby forming an aqueous solution of 2,4,6-trimethylolphenol and a lower liquid layer of hydrated hydrogen sodium orthophosphates and separating said liquid layer and the aqueous solution of trimethylolphenol.

2. Method claimed in claim 1 wherein the acid compound is orthophosphoric acid.

3. Method claimed in claim 1 wherein the acid compound is monosodium orthophosphate.

4. A method for preparing directly polymerizable aqueous solutions of 2,4,6-trimethylolphenol substantially free of resinous by-products and mineral salts which includes the steps of slowly adding to an aqueous solution of sodium 2,4,6-trimethylolphenate maintained at a temperature between about 0° and 68° C. an amount of orthophosphoric acid sufficient to provide a pH in said solution of between about 5 and about 9, thereby forming an aqueous solution of 2,4,6-trimethylolphenol and a lower liquid layer of hydrated hydrogen sodium orthophosphates and removing said liquid layer from the aqueous solution of trimethylolphenol and cooling the aqueous solution of trimethylolphenol to precipitate remaining hydrated hydrogen sodium orthophosphates.

5. Method claimed in claim 4 wherein the pH is brought to between 7.0 and 8.0.

6. Method claimed in claim 4 wherein the orthophosphoric acid is added while the aqueous solution of sodium 2,4,6-trimethylolphenate is maintained at a temperature between 0° and 50° C.

7. Method claimed in claim 4 wherein the orthophosphoric acid is added while the mixture is maintained at a temperature between 40° and 50° C. and the pH is between 7.0 and 8.0.

8. Method claimed in claim 4 wherein commercial phosphoric acid is added while the aqueous solution of sodium 2,4,6-trimethylolphenate is maintained at a temperature of about 40°–50° C.

9. Process according to claim 8 wherein the pH is brought to about 7.5.

References Cited in the file of this patent

UNITED STATES PATENTS 2,889,374    Meyers _____ June 2, 1959

OTHER REFERENCES

Freeman: Jour. Amer. Chem. Soc., 74:6259 (1952) (1 page).